Feb. 26, 1929.
L. H. NOAH
1,703,497
MOTION TRANSMITTING DEVICE
Filed April 28, 1927   2 Sheets-Sheet 1
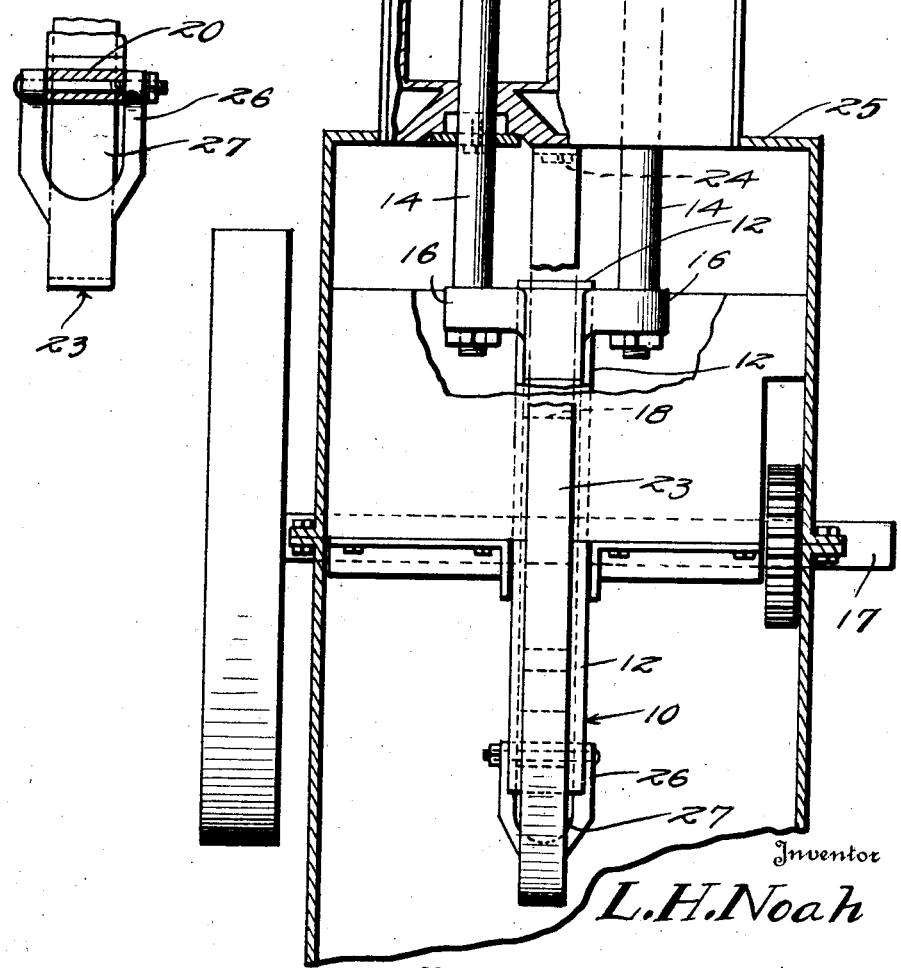
Inventor
L. H. Noah
By Watson E. Coleman
Attorney

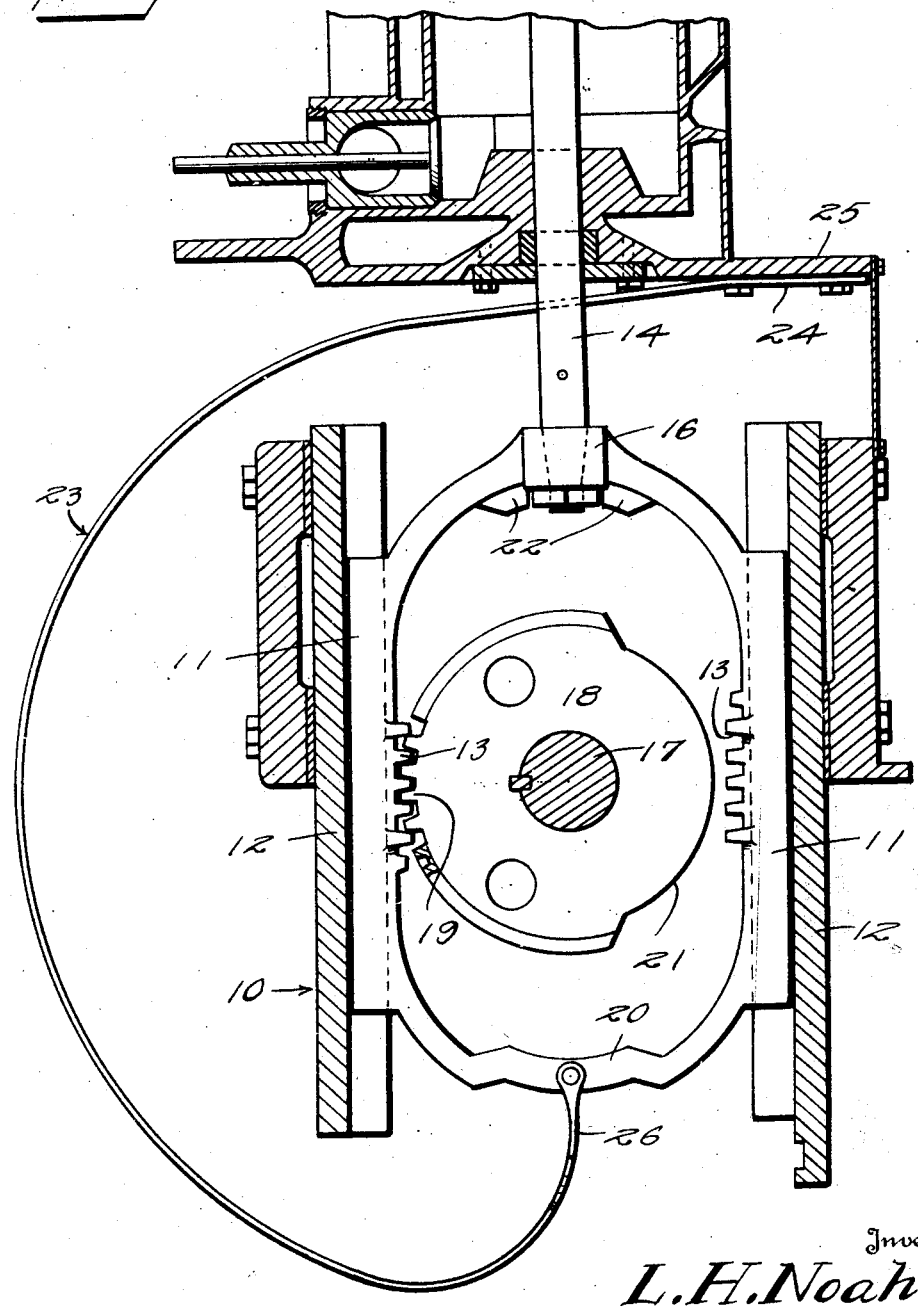

Patented Feb. 26, 1929.

1,703,497

UNITED STATES PATENT OFFICE.

LEROY H. NOAH, OF OGALLAH, KANSAS.

MOTION-TRANSMITTING DEVICE.

Application filed April 28, 1927. Serial No. 187,364.

This invention relates to motion transmitting devices and more particularly to that type of motion transmitting device, wherein a reciprocation of an element is changed to rotation through the medium of a yoke having opposed racks alternately engaging with the teeth of a mutilated gear.

An important and specific object of the invention is to provide a means whereby the yoke in a construction of this character, when employed in an engine, either steam or internal combustion, is firmly held against movement during such periods, as there is no actual engagement between the teeth of the racks and mutilated gear, so that these racks will always be properly positioned for engagement by the teeth of the gear.

A further object of the invention is to provide a construction such that a single spring may be employed for this purpose and will provide the necessary holding force when the yoke is at either limit of its movement.

These and other objects I attain by the construction shown in the accompanying drawings, wherein for the purpose of illustration is shown a preferred embodiment of my invention and wherein:—

Figure 1 is a side elevation partially in section of an engine embodying a motion transmitting device having applied thereto a yoke retaining spring in accordance with my invention;

Figure 2 is a transverse sectional view through the engine showing the yoke in its central position and the spring in its normal position;

Figure 3 is a detail sectional view illustrating the slotting of the spring for the reception of the yoke.

Referring now more particularly to the drawings, wherein my invention is shown as applied to the power transmitting yoke of an internal combustion engine, the numeral 10 generally designates the yoke, which includes side members 11 slidably engaged with guides 12 and each having at their inner face a rack 13. This yoke is directly connected in the present illustration with the piston rods 14 of the pistons 15 of two adjacent cylinders, the connection being made through ears 16 projecting from side faces of the yoke.

The numeral 17 designates the shaft of the engine and 18 a mutilated gear mounted thereon. This mutilated gear is in the form of a disk having an intermediate toothed portion 19, the teeth of which are formed by slotting the periphery of the disk and are adapted to receive the teeth of the racks, which project from the face of the side members of the yoke. At opposite sides of this toothed portion, the periphery of the disk is adapted for engagement with the portions of the side members of the yoke lying above and below the rack and with the adjacent portions of the end members 20 of the yoke. At the opposite side of the disk from the toothed portion 19, there is a cut-away portion 21 adapted for alternate engagement with abutments 22 extending inwardly from the inner faces of the ends 20 of the yoke. The cut-away portion 21 is of greater length than the abutments, so that for a short time, the gear 18 may rotate without effecting any movement of the yoke.

It will be obvious that with a construction of this character, there will be a tendency on the part of the yoke to separate from the relieved portion 21 of the face of the mutilated gear and that this tendency would be accentuated at high speeds and cause knocking which would not only cause unpleasant noises, but would likewise result in undue strain being placed upon both the yoke and gear. There is furthermore likelihood of improper engagement between the teeth of the gear and the yoke. I accordingly provide spring means, generally designated at 23, for normally maintaining this yoke in a central or intermediate position, with the result that when the yoke is at either end of its stroke, the spring is constantly urging it toward said central position and maintains engagement between the yoke and gear, insuring proper engagement and preventing knocking. In the present illustration, the spring means 23 comprises a single spring, which is substantially C-shaped and has one end 24 thereof secured to the wall 25 of the engine base and the opposite end 26 thereof secured to the remote end 20 of the yoke. The end 26 of the spring is slotted to receive between the arms formed by the slotting the yoke and permit the necessary movement of the spring with relation to the fixed guide 12 to which it is opposed, as indicated at 27. This spring is so shaped that when the yoke is in a central position, it is relieved of all tension. If, accordingly the yoke is moved toward either end of its movement, the spring is put under increasing tension and at the end of the stroke will perform the functions hereinbefore set forth.

Since the construction hereinbefore set forth is capable of a certain range of change and modifications without materially departing from the spirit of the invention, I do not limit myself to such specific structure except as hereinafter claimed.

I claim:

1. In combination with power transmitting apparatus comprising a yoke including opposed racks and opposed end members connecting the ends of the racks and a mutilated gear coacting therewith and rotated by reciprocation of the yoke and a single spring means for maintaining the yoke and mutilated gear in engagement one with the other during the period when the yoke is reversing the direction of its movement.

2. In combination with power transmitting apparatus comprising a yoke including opposed racks and opposed end members connecting the ends of the racks and a mutilated gear coacting therewith and rotated by reciprocation of the yoke and a leaf spring connected to the yoke and flexible in the direction of movement of the yoke, said spring being free from tension when the yoke is at a central position.

In testimony whereof I hereunto affix my signature.

LEROY H. NOAH.